July 9, 1963 H. WALLSTEN 3,097,085
METHOD AND MEANS FOR THE MANUFACTURE OF
FIBRES OF THERMOPLASTIC MATERIAL
Filed July 2, 1959 4 Sheets-Sheet 1
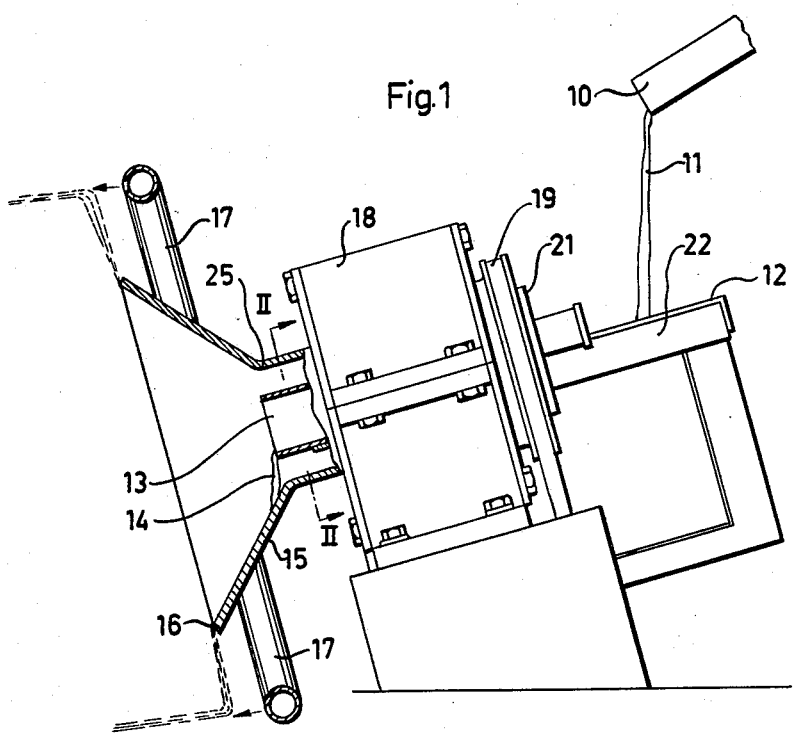
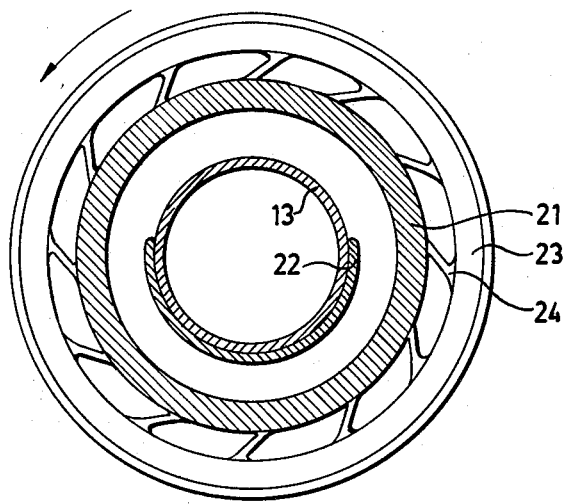
HANS WALLSTEN
INVENTOR.
BY Albert M. Parker
ATTORNEY.

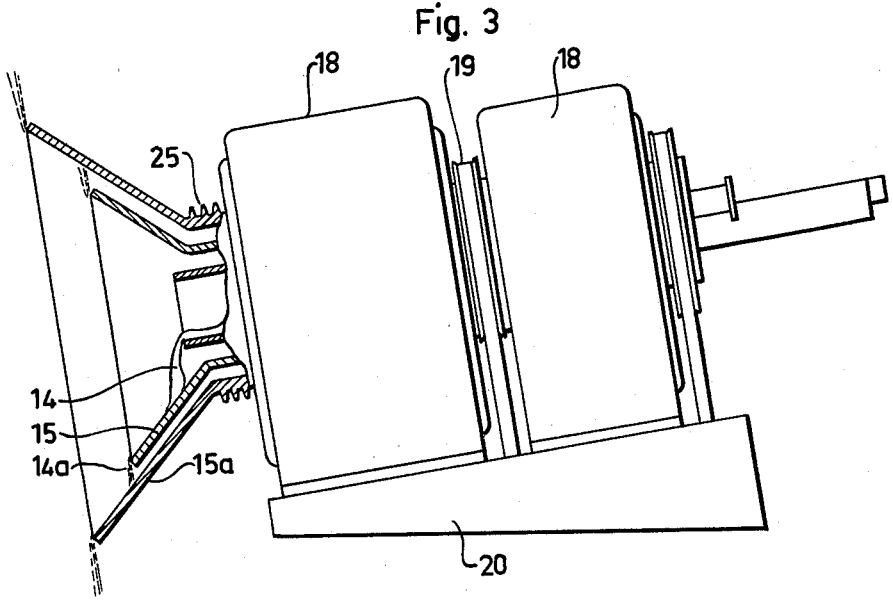

July 9, 1963  H. WALLSTEN  3,097,085
METHOD AND MEANS FOR THE MANUFACTURE OF
FIBRES OF THERMOPLASTIC MATERIAL
Filed July 2, 1959  4 Sheets-Sheet 3

HANS WALLSTEN
INVENTOR.
BY Albert M. Parker
ATTORNEY.

HANS WALLSTEN
INVENTOR.

ATTORNEY.

United States Patent Office 3,097,085
Patented July 9, 1963

3,097,085
METHOD AND MEANS FOR THE MANUFACTURE OF FIBRES OF THERMOPLASTIC MATERIAL
Hans Wallsten, Billingsfors, Sweden
Filed July 2, 1959, Ser. No. 824,528
11 Claims. (Cl. 65—8)

The present invention relates to a method for producing fibres of thermoplastic material, for instance molten mineral, and an apparatus for such a production.

More particularly the invention relates to the known centrifugal process for producing fibres of thermoplastic materials, e.g. a melt of mineralic material or glass for the manufacture of so called mineral wool (rock wool) or glass wool. According to this process a continuously supplied stream or jet of the molten thermoplastic material is caused to travel along the inside of a rotating conical funnel-shaped surface by rotating the funnel so that the layer of material reaches a discharging edge located at the wide end of the funnel and is ejected out therefrom in the form of fibres under the action of the centrifugal force.

For the time being the manufacture of so called mineral wool is performed substantially according to two known fundamental principles. One of these is called the blowing method and the other is called the throwing method.

In the manufacture of mineral wool according to the blowing method the molten material is subjected to a gas flow having a very high velocity and is then disintegrated into fibres and small particles. Initially these particles have a considerably lower velocity than the gas flow, which causes the originally round particles to be extended to fibres due to the friction against the gas flow. Meanwhile the difference in velocity between the gas flow and the particles is more and more reduced so that finally the fibres will have the same velocity and direction as the gas flow. In this method, which is used in various modifications, the velocity of the gas flow is of crucial importance for the formation of fibres. In practice very high gas flow velocities are used. The method in question is marred by several disadvantages. Thus, for instance, it is difficult to attain a satisfactory disintegration of the molten material by means of the gas flow. Moreover, also unsufficiently disintegrated particles are caught by the gas flow and will be found in the form of solidified balls, so called beads, intermingled with the finished wool. In the so called throwing or centrifugal process, to which the present method relates, a very high velocity in relation to the surrounding air is imparted to the molten material by means of a centrifuge or the like. When the material leaves the centrifuge it is disintegrated into fibres and small particles, as a rule uniformly, under the action of centrifugal forces and on account of the friction against the air said particles will be transformed into fibres. In order to attain a good result by this method a velocity between 60 and 100 meters per second should be imparted to the molten material, which may involve difficulties.

In a known process the rotating funnel is vertically mounted with its narrow end immersed in the melt while the funnel gets wider continuously upwards-outwards according to a suitable curve. By the centrifugal force the melt is distributed and caused to rotate at the same time as the layer, being distributed and rotating hereby, travels axially until it reaches the edge of the rotating funnel and is stretched out or extended to fibres, substantially in the horizontal plane.

However, in view of i.a. the collection of the fibrous material thus formed this device is marred with disadvantages as the fibres formed, before they can be delivered to a suitable reception means, must first be caused to pass at least in part around portions of the centrifugal machinery. This will entail local accumulation and uneven felting, leaving an inhomogeneous product as a result.

The main object of the invention is to improve the hitherto existing process of throwing or centrifuging the fibres by means of a funnel-shaped surface. The invention is primarily characterized by causing the funnel in form of a frustum of a cone to rotate about its axis which is horizontal or inclines downwards towards the terminal edge of the funnel, adjusting the speed of rotation in such a way that the thermoplastic material is ejected from the throwing edge and on account of its speed is transformed, into fibres during the progress of a free radial flight, and causing a controlled annular gas flow concentric with said axis to carry away the finished completely solidified fibres some distance from the throwing edge in a direction approximately parallel to the axis of rotation of said funnel.

By this new method the fibres, just after they have been formed will be caused to travel in the desired direction under the action of the controlled gas flow or conveying air so that said fibres will get clear of the throwing or centrifuging device to provide an adjustable and uniform flow of fibres which may successively deposit on a suitable reception device, for instance a wire cloth or some other conveyor. The flow of compressed gas does not contribute to the formation of fibres but is only used as a conveyor medium for the fibres formed and thus no high gas flow velocities need be involved. Since the gas flow is directed substantially horizontally particles not completely disintegrated will be ejected in a plane which is substantially perpendicular to the direction of the gas flow. On account of the comparatively low velocity of the gas flow there is therefore no risk of so called beads being entrained by the fibres. In order to generate the flow of compressed gas a simple fan may be used.

The invention will be further described in the following with reference to an embodiment of the invention, shown in the attached drawings, for performing the new process. In the drawings:

FIG. 1 is an elevational view, partly in section, of an embodiment of the device, and FIG. 2 is a sectional view, taken on line II—II in FIG. 1, showing means for cooling part of the rotor.

FIG. 3 shows a modification of the invention.

Figure 4:
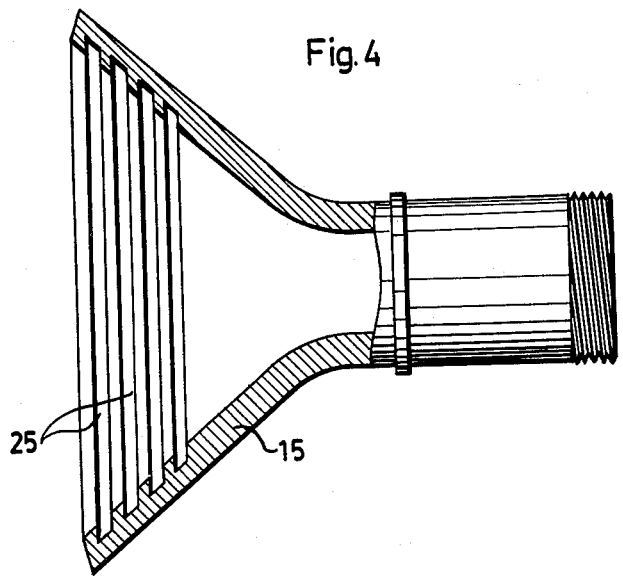
FIGS. 4 and 5 show a modified embodiment of the conical part of the rotor in order to enable an efficient air or liquid cooling of this part.

10 designates an inlet for the molten material 11. Below the inlet 10 and in the path of the jet 11 of melt there is arranged an inclined gutter, the jet of melt entering into the top end 12 of said gutter. The melt is then conducted along the gutter 12, on account of its inclination to the horizontal plane, and through the centrifuging device. When the melt arrives at the opposite end 13 of the gutter the melt passes into a new jet 14 which strikes the inner side of the conically funnel-shaped rotor 15. This rotates at a comparatively high speed and thus causes the melt to be flattened out around the inner surface. On account of the centrifugal force the melt is forced obliquely outwards and is brought along in the rotation of the rotor, and when the melt has reached the edge 16 of the rotor it is well flattened out into a homogeneous rotating layer, which, because of the action of the centrifugal forces, is ejected from the edge 16 and then disintegrated all around the edge and stretched out to fibres. The fibres are thus formed in a plane between the edge 16 and the concentric annular gas flow which carries away the finished fibres.

The fibres thus formed are ejected in this plane which is substantially perpendicular to the axis of rotation of the rotor. 17 designates a device in the form of a ring for supply of compressed air or some other compressed gas, which enables an adjustable and controllable flow of fibres in the desired direction to be obtained. The conical part 15 of the rotor leads to a cylindrical part 25, 21 which holds the rotor in position by means of suitable bearing devices 18. The end portion of the cylindrical part 25 of the rotor is designated 21. The rotor is caused to rotate by suitable means, for instance an electric motor with an associated driving device, illustrated in FIG. 1, by the belt pulley 19. FIG. 3 indicates a part 20 of the base member upon which the device rests. According to the embodiment of the invention exemplified here, the gutter 12—13 in FIGS. 1 and 2 is supported in a bracket 22 which suitably may be displaceable axially in order to enable adjustment of the position of the jet 14 of melt in relation to the rotor 15.

FIG. 2 relates to an embodiment for establishing an efficient cooling of the bearings of the rotor which otherwise for natural reasons would be subjected to a strong heating because of the heat radiation from the gutter 13 and bracket 22. The cylindrical part 21 of the rotor is concentrically secured to a surrounding cylindrical tube 23 by means of spacers 24 which are shaped as fan blades. The tube 23 is externally carried in bearings. When the rotor rotates the fan blades 24 and the external tube 23 are thus brought along, a cooling air stream being formed between the rotor part 21 and the tube 23.

Of course also other embodiments may be contemplated for providing the effect stated. Thus a good cooling effect may be attained if, for instance, an air stream is directed into the interspace between the rotor and a concentric tube surrounding the same.

The cylindrical part of the rotor may of course also be provided with double walls so that cooling is effected by means of a flow of liquid which is caused to circulate in the interspace.

It has proved to be a great advantage if the bracket 22 during the starting operation may be displaced so that the jet 14 of melt drops outside the funnel 15. The jet of melt will then, by the bracket being slowly moved backwards, preheat the rotating funnel. When the jet then strikes the funnel in the proper point for throwing, the funnel is thus preheated. If, in starting, the jet is allowed to strike the cold funnel directly without this preheating there is a risk of the melt solidifying, which may easily cause unbalance and leads to a bursting of the solidified melt layer.

According to FIG. 3 the melt 14 strikes the inner surface of a funnel 15 in the same manner as previously stated, but the disintegrated and rotating melt 14a is caught, after it has left the edge of the funnel 15, by the inner surface of a second funnel 15a which is mounted concentrically in relation to the first mentioned funnel 15 but rotates at a higher angular speed than this funnel. This embodiment has certain advantages, especially as regards the capacity.

In the manufacture of mineral wool, for instance, it has proved advisable to use a mineral melt of the same character as that used in the usual blowing process, for instance, molten blast furnace slag or suitable molten species of stone or a mixture thereof. The temperature of the melt depends on the nature of the molten material but for blast furnace slag a temperature of about 1300° C. of the melt supplied has turned out to be suitable.

In view of the great stresses to which the conical part of the funnel is subjected on account of the high rotary speeds and temperatures prevailing in the manufacture of mineral wool it has turned out to be necessary to provide an efficient cooling of the outside of the funnel by means of air or a liquid, e.g. water, in order to keep the temperature of the funnel material sufficiently low. However, too strong a cooling will easily cause such a great conducting away of heat that the melt layer on the inside of the funnel partly solidifies so that the acting centrifugal forces will tear the solidified layer to pieces, solidified pieces of slag being ejected from the apparatus, and vibrations arise because of unbalance. By providing according to FIG. 4 the inside of the funnel with a series of concentrical grooves 25 the layer of mineral wool solidified at the cooling will be retained by the funnel and in this way a protective coating of solidified melt is obtained on the inside of the funnel. This solidified layer of melt partly forms a protection against erosion caused by the jet of melt, especially where this strikes the inside of the funnel, and partly it forms a heat insulating coating so that the temperature may be maintained low by cooling without the melt advancing in the funnel being cooled so strongly that it solidifies too soon.

Figure 5:
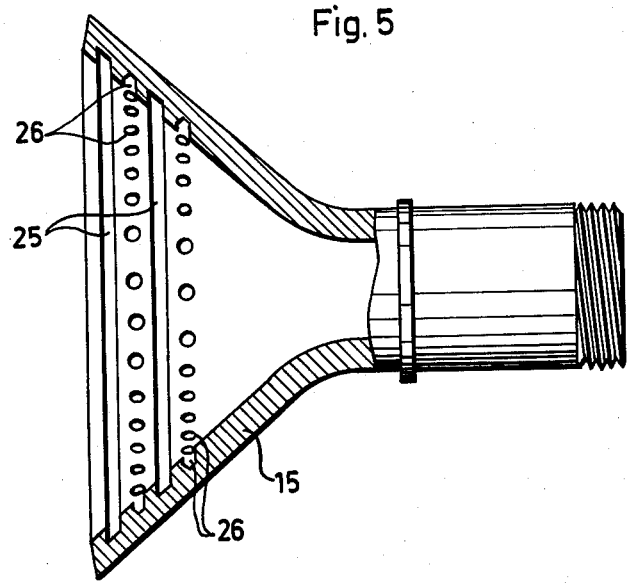

Of course also other embodiments than concentrical grooves 25 may be contemplated. Thus it has been found, for instance, that a series of bores 26 (FIG. 5) in the inside of the funnel, or a combination of bores and concentrical grooves, give a favourable result. Such bores also serve for fixing the solidified layer of melt on the inside of the funnel in order to prevent the layer of melt from dragging during the rotation in relationship to the funnel, which otherwise may cause unnormal wear of the inside of the funnel. In FIG. 5 there is shown an embodiment of a funnel having such bores 26 as well as concentric grooves 25.

Figure 6:
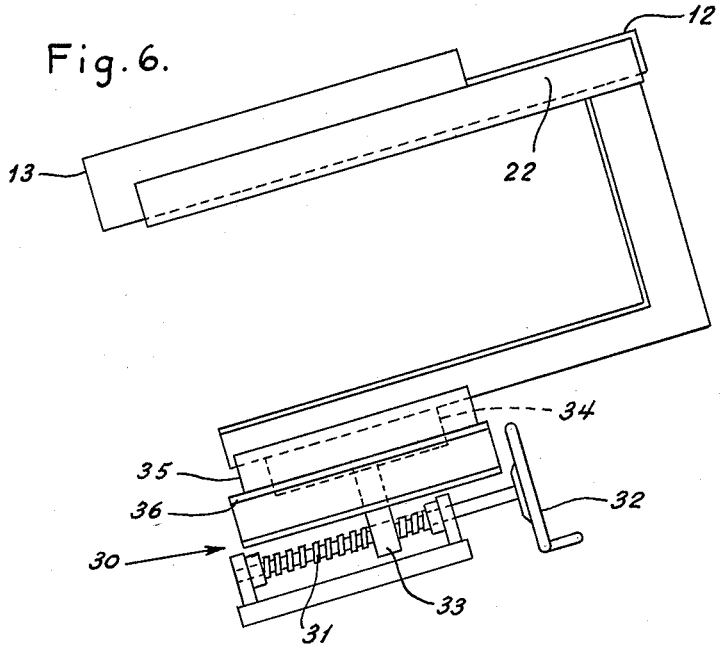
FIGS. 6 and 7 illustrate a modified embodiment of part of the device according to the invention, FIG. 6 being a side elevation and FIG. 7 a front view thereof.
Figure 7:
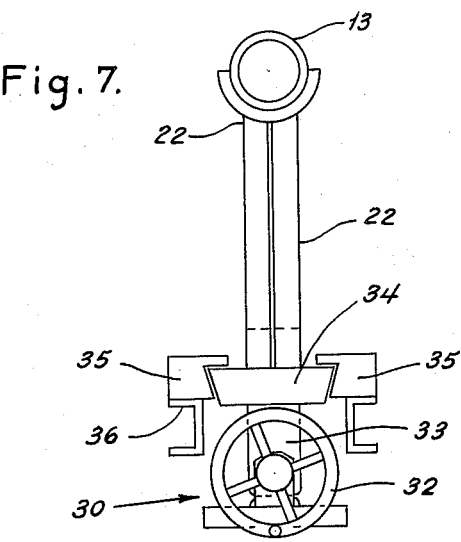

As shown in FIGS. 6 and 7 the bracket 22 carrying the gutter 12, 13 is adjustable in longitudinal direction by means of a feeding mechanism generally indicated at 30. Such mechanism comprises a rotatable screw 31 which can be rotated by means of a hand-wheel 32 and is screwed into the threaded bore of an arm 33 projecting laterally from the base 34 of the bracket 22. The base 34 is guided longitudinally in guide ways formed in the guides 35 which in turn are carried on the stationary beams 36. By rotating the screw 31 the bracket 22 with the gutter 12, 13 will thus be adjusted longitudinally.

An erosion protective and heat insulating layer may also be provided by a ceramic material having a high heat resistance being filled in the concentrical grooves.

It has been found that a suitable material for the funnels 15, 15a is a high-tensile rustproof steel having a chromium content of about 13%.

A suitable periphery speed of the funnel 15 according to FIG. 1 when throwing a certain melt of mineral may be, for instance, about 80 m./sec., which approximately corresponds to the rotary speed of 70 revolutions per second at a funnel opening diameter of 350 mm.

When using two concentrical funnels 15, 15a according to FIG. 3, the funnel end 15 is suitably provided with a diameter of about 250 mm. and rotates at a speed of 30 r.p.s., while the funnel end 15a may have a diameter of 350 mm. and a rotary speed of 70 r.p.s.

The diameter of the ring 17 should be adjusted in such a way that it is about 200 mm. larger than the diameter of the funnel end. Good results have been attained with a series of holes drilled about the ring and having a diameter of 3 mm. and a spacing of 3 cm. The ring has then been connected to a compressed air system having a pressure of about 2 kg./cm.² This ring may possibly be replaced by some other device for generating the air of gas stream aimed at.

The examples referred do not constitute any critical values, but the invention may also be exercised in accordance with other data.

An addition of impregnating and/or binding agents may be made together with the conveying air from the ring 17 in order to bring about a very even distribution of the agent in question in the fibrous material. This is possible because of the fact that the fibres have not managed to mat together to any appreciable extent before they are coated with the impregnating or binding agent, respectively.

What I claim is:

1. A method of producing fibres of thermoplastic material comprising the steps of continuously supplying molten thermoplastic material in the form of a fluid stream against the smaller end of an internally facing frusto-conical surface in the form of a funnel, rotating said surface about a substantially horizontal axis and causing said fluid material to flatten out against said surface, forcing said material outwardly along said surface and forming the same into a homogeneous layer to be discharged from said outer edge, effecting said rotation at a speed to discharge said material from said outer edge and to transform said discharged material into fibres during the progress of free radial flight from said edge, cooling the external surface of said funnel by means of a cooling fluid and causing a controlled annular gas flow concentric with said axis but spaced from said discharging edge a sufficient distance to allow said fibres to form to carry away the finished completely solidified fibres while turning the same into a path extending in a direction approximately parallel to the axis of rotation of said funnel.

2. An apparatus for producing fibres of thermoplastic material from molten thermoplastic material, comprising in combination a funnel in the form of a frustum of a cone, bearing means carrying said funnel at its narrow end so as to be rotatable about an approximately horizontal axis, means for imparting to said funnel a rotary movement at a velocity corresponding to a peripheral speed at the edge of the wide end of said funnel of at least about 60 meters per second, means for supplying molten thermoplastic material to the interior surface of said funnel adjacent the narrow end of said funnel, said edge of said wide end serving for discharging the thermoplastic molten material from said funnel to transform said molten thermoplastic material into fibres during the progress of free radial flight, means for cooling the external surface of said funnel, means arranged around and in substantially spaced relation with respect to said discharging edge for generating an annular gas flow for carrying away fibres ejected from said discharging edge, and means in the form of a gravity gutter cooperating with said molten thermoplastic material supply means in such a manner as to receive the fluid stream and deliver it to the internal face of the funnel opening into the narrow end of said funnel and having an inclination approximately equal to the inclination of the rotational axis of said funnel.

3. An apparatus according to claim 2, wherein the funnel is provided internally with recesses, in which a part of the molten material may solidify and form a protective layer.

4. An apparatus according to claim 2, wherein the funnel is provided internally with recesses which are filled with a ceramic material having a high heat resistance.

5. An apparatus according to claim 2 wherein a cylindrical member surrounds the funnel neck, spacing elements securing said cylindrical member to said funnel neck and bearing means rotatably carrying said cylindrical member.

6. An apparatus according to claim 5 and including means for forcing a cooling air stream to pass in the interspace between said cylindrical member and said funnel neck.

7. An apparatus as claimed in claim 6 wherein said spacing elements are formed as fan blades for propelling said cooling air stream.

8. Apparatus as in claim 2 wherein the axis of said funnel inclines downwardly from the smaller to the larger end thereof.

9. An apparatus for producing fibres of thermoplastic material from molten thermoplastic material, comprising in combination, a funnel in the form of a frustum of a cone, bearing means carrying said funnel at its narrow end so as to be rotatable about an approximately horizontal axis, means for imparting to said funnel a rotary movement at a velocity corresponding to a peripheral speed at the edge of the wide end of said funnel of at least about 60 meters per second, means for supplying molten thermoplastic material to the interior surface of said funnel adjacent the narrow end of said funnel, said edge of said wide end serving for discharging the thermoplastic molten material from said funnel to transform said molten thermoplastic material into fibres during the progress of free radial flight, means arranged around and in substantially spaced relation with respect to said discharging edge for generating an annular gas flow for carrying away fibres ejected from said discharging edge, and means in the form of a gravity gutter cooperating with the molten thermoplastic material supply means in such a manner as to receive the fluid stream and deliver such to the internal face of the funnel opening into the narrow end of said funnel and having an inclination approximately equal to the inclination of the rotational axis of said funnel, and means for displacing said gravity gutter for adjusting the point of the funnel where the molten material is supplied.

10. An apparatus according to claim 9 and including means for cooling the external surface of said funnel.

11. The method as in claim 1 and including setting the speed of said annular gas flow low enough to enable beads of said material to continue in a path through said gas flow and substantially perpendicular with respect thereto to avoid entrainment of the same by said fibres.

References Cited in the file of this patent

UNITED STATES PATENTS

| | | |
|---|---|---|
| 65,339 | Butcher et al. | June 4, 1867 |
| 2,153,739 | Buss | Apr. 11, 1939 |
| 2,294,588 | Von Pagsiczky | Sept. 1, 1942 |
| 2,682,079 | Richardson | June 29, 1954 |
| 2,707,847 | Anliker | May 10, 1955 |
| 2,784,451 | Bowen | Mar. 12, 1957 |
| 2,793,395 | Richardson | May 28, 1957 |
| 2,839,782 | Tillotson | June 24, 1958 |
| 2,874,406 | Firnhaber et al. | Feb. 24, 1959 |
| 2,882,552 | Downey | Apr. 21, 1959 |
| 2,944,284 | Tillotson et al. | July 12, 1960 |
| 2,949,632 | Kleist et al. | Aug. 23, 1960 |
| 2,980,952 | Stalego | Apr. 25, 1961 |
| 3,013,299 | Owens | Dec. 19, 1961 |

FOREIGN PATENTS

| | | |
|---|---|---|
| 147,892 | Australia | Aug. 22, 1952 |
| 205,436 | Australia | Jan. 7, 1957 |
| 751,261 | Great Britain | June 27, 1956 |